United States Patent [19]

Tatzel et al.

[11] 4,031,179

[45] June 21, 1977

[54] MANUFACTURE OF SHAPED ARTICLES OF FOAMED OLEFIN POLYMERS

[75] Inventors: Hermann Tatzel, Leutershausen; Wolfram Koegel, Mannheim; Gilbert Beck, Ludwigshafen; Ludwig Zuern, Bad Duerkheim; Arndt Christian Caesar, Frankenthal, all of Germany

[73] Assignee: BASF Aktiengesellschaft, Ludwigshafen (Rhine), Germany

[22] Filed: June 18, 1974

[21] Appl. No.: 480,404

[30] Foreign Application Priority Data

June 20, 1973 Germany .......................... 2331304

[52] U.S. Cl. ............................... 264/91; 260/2.5 B; 264/53; 264/102; 264/126; 264/143; 264/DIG. 7; 264/DIG. 18
[51] Int. Cl.² ........................................... B29F 5/02
[58] Field of Search ............. 264/DIG. 18, 101, 91, 264/102, 109, 126, 2.5 B

[56] References Cited

UNITED STATES PATENTS

| | | | |
|---|---|---|---|
| 3,086,248 | 4/1963 | Culp | 264/101 X |
| 3,255,286 | 6/1966 | Luc-Belmont | 264/DIG. 7 |
| 3,312,760 | 4/1967 | Berner | 264/101 X |
| 3,341,480 | 9/1967 | Feild | 264/DIG. 18 |
| 3,427,372 | 2/1969 | Berner | 264/101 X |
| 3,594,461 | 7/1971 | Jacob | 264/101 X |
| 3,818,086 | 6/1974 | Stastny et al. | 264/DIG. 18 |
| 3,823,213 | 7/1974 | Stastny et al. | 264/DIG. 17 |
| 3,832,429 | 8/1974 | Charpentier | 264/101 X |

FOREIGN PATENTS OR APPLICATIONS 623,804  7/1961   Canada ........................ 264/DIG. 7

Primary Examiner—Philip Anderson
Attorney, Agent, or Firm—Johnston, Keil, Thompson & Shurtleff

[57] ABSTRACT

Shaped articles are produced by heating and compressing particles of foamed olefin polymer containing crosslinked portions in molds, the pressure being reduced during compression in the mold.

3 Claims, 1 Drawing Figure

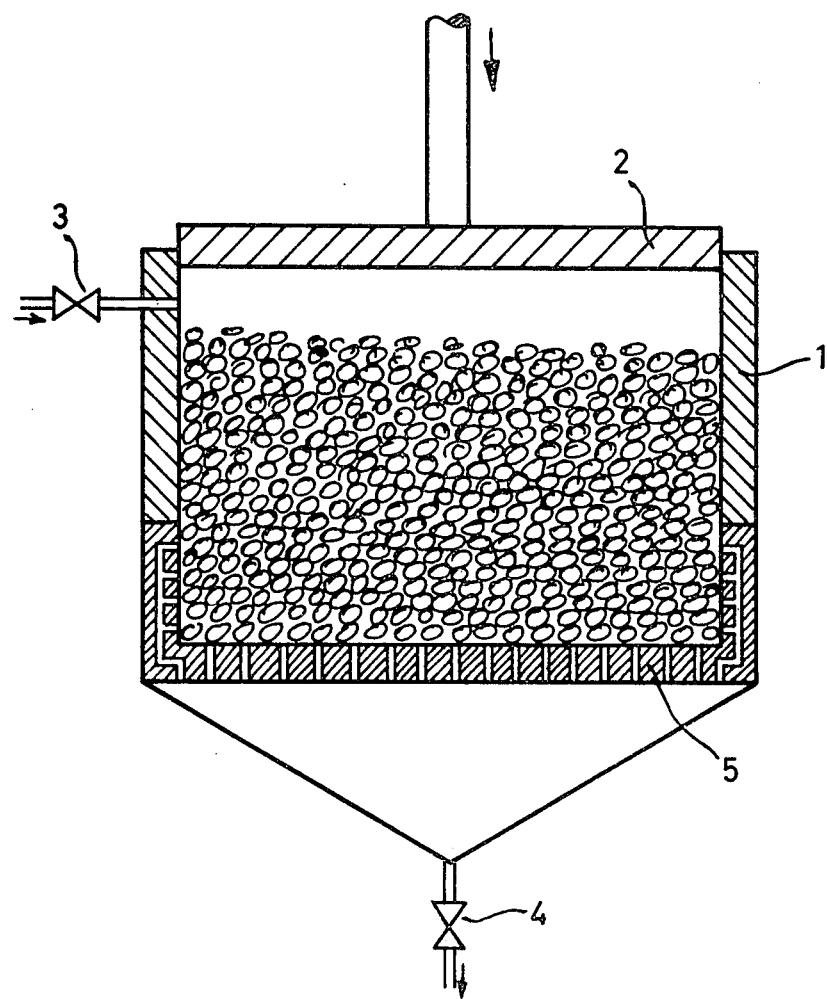

MANUFACTURE OF SHAPED ARTICLES OF FOAMED OLEFIN POLYMERS

This application discloses and claims subject matter described in German Pat. application No. P 23 31 304.4, filed June 20, 1973, which is incorporated herein by reference.

The present invention relates to a process for the manufacture of shaped articles of foamed olefin polymers by heating and compressing foamed crosslinked particles of an olefin polymer in molds.

German Published application No. 1,629,281 discloses a method of heating foamed crosslinked particles of an olefin polymer in molds, which are not gastight when closed, to temperatures above the crystallite melting point of the olefin polymer and of compressing the particles in the mold by from 5 to 60% of their bulk volume. This method makes it possible to produce flexible moldings having a very low density, e.g., a density of from 15 to 30 g/l. Such shaped foams have good surface characteristics and good mechanical properties. However, these shaped articles suffer from the drawback that they contain voids. These voids result from the fact that air is trapped and compressed between the particles when they are compressed in the mold. Due to the sealing properties of the foamed particles, the trapped air cannot escape.

It is an object of the invention to modify the above process in such a manner that the shaped foams obtained contain no blisters.

This object is achieved, according to the invention, by reducing the pressure in the mold prior to or during compression of the foamed crosslinked particles to at least 50 mm of Hg less than ambient atmospheric pressure.

Suitable olefin polymers are those having an X-ray crystallinity of more than 20% by weight at a temperature of 25° C. We prefer to use ethylene polymers produced by the well-known high-pressure polymerization of ethylene, e.g. polyethylene having a density of from 0.918 to 0.935 g/cm$^3$ and copolymers of ethylene with other ethylenically unsaturated compounds. The ethylene copolymers contain at least 50% by weight of polymerized units of ethylene. Suitable comonomers are, for example, acrylates and methacrylates in which the ester component is derived from an alcohol of from 1 to 18 carbon atoms, vinyl esters of carboxylic acids of from 2 to 12 carbon atoms such as vinyl acetate and vinyl proprionate, fumaric acid, itaconic acid, maleic acid and esters thereof, carbon monoxide, acrylic acid and methacrylic acid. The ethylene copolymers may, if desired, contain polymerized units of 2 or more ethylenically unsaturated compounds, for example they may be copolymers of ethylene, vinyl acetate and ethyl acrylate or copolymers of ethylene, acrylic acid and t-butyl acrylate. The melt index of the olefin polymers is between 0.1 and 200 g/10 min. (190° C/21.6 kg).

Foamed particles of olefin polymers are well known. They contain mainly closed cells. The foamed particles are made by mixing an olefin polymer or a mixture of a number of olefin polymers in an extruder with a volatile expanding agent at temperatures above the crystallite melting point of the olefin polymer, cooling the mixture to a temperature near the crystallite melting point of the polymer and extruding the expandable mixture through a perforated die. The extrudate foams and is broken up into particles. In this way, completely foamed olefin polymer particles are obtained.

In the preferred embodiment of the process of the invention, the completely foamed particles of olefin polymer are crosslinked by the action of high-energy radiation. Irradiation is mainly carried out with electron beams but may also be effected with X-rays or cobalt rays. The dose of radiation is from 10 to 80 and preferably from 40 to 60 megarads. The completely foamed particles contain, after such irradiation, from 10 to 85% and preferably from 30 to 70%, by weight, of crosslinked portions. By crosslinked portions or gel content we mean the portion, by weight, of the polymer which is insoluble in solvents at a temperatures above the crystallite melting point of the polymer. In the case of ethylene copolymers, for example, the gel content is determined by heating the foamed particles in toluene to a temperature of 100° C, filtering and drying the insoluble portions.

Alternatively, foamed crosslinked particles may be used which have been made by heating a mixture of an olefin polymer, a gas-donating expanding agent and a peroxide and breaking up the resulting foam. Foaming of the mixture is achieved by heating it to temperatures above the decomposition point of the peroxide and of the gas-donating expanding agent. Processes for the manufacture of such foams are well known. The diameter of the completely foamed olefin polymer particles is between 1 and 35 mm and preferably between 3 and 20 mm. The bulk density of the particles is from 5 to 200 and preferably from 10 to 60 g/l.

The particulate foamed olefin polymers may contain additives such as are commonly incorporated in olefin polymers, for example stabilizers, flameproofers, colorants, lubricants, fillers or other polymers such as polyisobutylene, polybutadiene-1,3 or polyisoprene.

The foamed crosslinked olefin polymer particles are sintered together in molds which are capable of being closed with a gas-tight seal. We prefer to use molds of which at least one of the walls is movable to enable the contents of the mold to be compressed. Alternatively, an arrangement consisting of 4 endless belts may be used, these being spatially related to each other so as to form a channel, the foamed crosslinked particles being fed to one end of said channel to be heated and compressed therein and then discharged at the other end of the channel in the form of a continuous foam. The endless belts are disposed so as to compress the particles. The endless belts may, if desired, be in the form of a chain of plates hinged together.

Whatever type of mold is used, it will comprise means for sucking off the gases or liquids contained in the mold. Such means may comprise, for example, a pipe union. Alternatively, molds may be used in which at least one of the walls is provided with perforations through which gases but not the foamed particles may escape. However, it is necessary to be able to seal these perforations and to evacuate the mold. In another embodiment of the process of the invention, perforated molds are used in which the particles can be compressed, the pressure in the mold being reduced by placing them in a pressure vessel which is then evacuated.

To achieve the required pressure difference between the interior of the mold and ambient atmospheric pressure, vacuum pumps or similar equipment may be used. The pressure in the mold should be at least 50 mm Hg less than atmospheric pressure. Preferably, the pressure in the mold is reduced to a value which is from 100 to 700 mm of Hg below atmospheric pressure. It is even possible to reduce the pressure in the mold to 0.1 mm of Hg. The pressure difference used depends on the polymer used and on the degree of crosslinking thereof. The reduction of the pressure in the mold should not lead to bursting of the cells in the foamed particles or to undue expansion of the particles themselves.

In order to weld the completely foamed crosslinked particles together, they are heated to temperatures which are from 5° to 150° and preferably from 10° to 100° C above the crystallite melting point of the polymer. For example, the particles may be heated in a flow of gas outside the mold and then fed to the mold. It is equally possible to heat the particles when in the mold by passing a gaseous or liquid heating medium through the mold or by heating the walls of the mold directly. The temperature to which the foamed crosslinked particles are heated depends on the polymer used, its degree of crosslinking and the additives contained therein. The particles are usually heated to temperatures of from 90° to 150° C and preferably from 110° to 180° C.

The pressure in the mold is lowered prior to or during compression of the foamed crosslinked olefin polymer particles. The loose pile of particles in the mold is compressed by from 40 to 80% and preferably from 50 to 70% of its original bulk volume.

This process makes it possible to produce shaped articles showing a uniformly good foam structure. The resulting shaped foams contain no voids and may be used in a number of applications, for example for upholstery, packaging, thermal or acoustic insulation in buildings and for making toys.

The present invention is illustrated below with reference to the following Examples, in which the percentages are by weight. The example should be read in connection with the attached schematic drawing which illustrates the invention.

EXAMPLE 1

Foamed spherical particles having a diameter of 20 mm and a bulk density of 16 g/l of a copolymer of 83% of ethylene and 17% of t-butyl acrylate and containing mainly closed cells are irradiated in a loose pile with a dose of 60 megarads. They then have a gel content of 84%. The particles are then placed in a metal mold (1) which can be pressure-sealed and which has one mechanically movable wall (2). The foamed cross-linked particles are heated with hot air to a temperature of 120° C, valve (3) being open. The pressure in the mold is then reduced to 80 mm Hg via suction valve 4) provided below the perforated bottom (5) of the metal mold. The charge of loose particles is then compressed by 60% of its original bulk volume by mechanically lowering the top wall (2) Following venting by turning the value (4) and a cooling period of about 5 minutes, a foam having a density of 26 g/l is removed from the mold. Samples cut from the molding show that it contains no voids.

EXAMPLE 2

Foamed particles of different materials are treated in the manner described in Example 1. The main features are listed in the following Table.

| Polymer | Gel content (degree of crosslinking) | Bulk density | Pressure reduction | Properties |
|---|---|---|---|---|
| Polyethylene | 55 | 14 | 520 | no voids |
| ethylene/vinyl acetate copolymer (8% vinyl acetate) | 42 | 15 | 350 | " |
| ethylene/methyl methacrylate copolymer (15% methyl methacrylate) | 35 | 17 | 150 | " |
| polyethylene | 50 | 13 | 0 | interparticle volume about 5% |

We claim:
1. A process for the manufacture of shaped articles of foamed olefin polymers consisting essentially of
   a. providing a gas-tight shaping means or mold having at least one movable wall means;
   b. introducing completely foamed crosslinked olefin polymer particles into said gas tight shaping means or mold;
   c. heating said particles by passing a gaseous or liquid heating medium through the mold, to temperatures which are from 5 to 150° above the crystallite melting point of said polymer;
   d. simultaneously mechanically compressing said particles by said movable wall means;
   e. reducing the air pressure in said shaping means or mold prior to or during said compression to a valve which is at least 50 mm of Hg below ambient atmospheric pressure to form a sintered foamed crosslinked olefin polymer article;
   f. venting said mold and cooling said article; and,
   g. removing said sintered foamed crosslinked olefin polymer article from said shaping means or mold.
2. A process as set forth in claim 1, wherein the pressure in the shaping means or mold is reduced by from 100 to 700 mm of Hg below ambient atmospheric pressure.
3. A process as set forth in claim 2 wherein a subatmospheric pressure is set up in the shaping means or mold as the foamed particles are compressed.

* * * * *